(12) United States Patent
Chang

(10) Patent No.: US 11,493,704 B2
(45) Date of Patent: Nov. 8, 2022

(54) OPTICAL MODULE AND ASSEMBLY METHOD THEREOF

(71) Applicant: Source Photonics Taiwan, Inc., Hsinchu (TW)

(72) Inventor: Yungcheng Chang, Hsinchu (TW)

(73) Assignee: Source Photonics Taiwan, Inc., Hsinchu (TW)

(*) Notice: Subject to any disclaimer, the term of this patent is extended or adjusted under 35 U.S.C. 154(b) by 1075 days.

(21) Appl. No.: 16/076,641

(22) PCT Filed: Aug. 3, 2018

(86) PCT No.: PCT/CN2018/098620
§ 371 (c)(1),
(2) Date: Aug. 8, 2018

(87) PCT Pub. No.: WO2020/024283
PCT Pub. Date: Feb. 6, 2020

(65) Prior Publication Data
US 2021/0199904 A1    Jul. 1, 2021

(51) Int. Cl.
*G02B 6/42*       (2006.01)
*G02B 6/293*      (2006.01)

(52) U.S. Cl.
CPC ....... *G02B 6/4214* (2013.01); *G02B 6/29361* (2013.01); *G02B 6/4215* (2013.01)

(58) Field of Classification Search
CPC . G02B 6/4214; G02B 6/29361; G02B 6/4215
See application file for complete search history.

(56) References Cited

U.S. PATENT DOCUMENTS

| 9,197,345 B2 | 11/2015 | Nakajima et al. |
| 9,363,021 B2 | 6/2016 | Fujimura et al. |
| 9,910,233 B2 | 3/2018 | Tamura |
| 10,128,974 B2 | 11/2018 | Kawamura et al. |

(Continued)

FOREIGN PATENT DOCUMENTS

| CN | 103163605 A | 6/2013 |
| CN | 104136953 A | 11/2014 |
| CN | 105474062 A | 4/2016 |

OTHER PUBLICATIONS

International Search Report and Written Opinion; International Searching Authority/CN dated Apr. 28, 2019; International Application No. PCT/CN2018/098620; 10 pages; International Searching Authority/National Intellectual Property Administration, PRC; Beijing, China.

*Primary Examiner* — Ryan A Lepisto
*Assistant Examiner* — Erin D Chiem
(74) *Attorney, Agent, or Firm* — Andrew D. Fortney; Central California IP Group, P.C.

(57) ABSTRACT

An optical module as disclosed includes an aligning bridge, an optical de-multiplexer and a lens array. The aligning bridge has a first section and a second section opposite to the first section. The optical de-multiplexer is on the first section of the aligning bridge. The optical de-multiplexer comprises a plurality of filters configured to transmit a plurality of light beams of different wavelengths. The lens array is on the second section of the aligning bridge. The lens array comprises a plurality of input ports aligned with the filters and configured to receive the light beams from the filters.

17 Claims, 14 Drawing Sheets

(56) References Cited

U.S. PATENT DOCUMENTS

| | | |
|---|---|---|
| 2013/0148970 A1 | 6/2013 | Nakajima et al. |
| 2014/0133862 A1 | 5/2014 | Fujimura et al. |
| 2014/0346323 A1 | 11/2014 | Fujimura et al. |
| 2015/0365175 A1 | 12/2015 | Kawamura et al. |
| 2016/0147017 A1 | 5/2016 | Tamura |
| 2016/0170145 A1 | 6/2016 | Kawamura et al. |
| 2017/0131474 A1* | 5/2017 | Dannenberg ......... G02B 6/2938 |

* cited by examiner

OPTICAL MODULE AND ASSEMBLY METHOD THEREOF

TECHNICAL FIELD

The present disclosure relates to an optical module and assembly method thereof, and more particularly to a receiver optical sub-assembly (ROSA) and assembly method thereof.

BACKGROUND

A receiver optical sub-assembly (ROSA) is one of several key sub-assemblies in an optical communication device. The conventional ROSA includes a de-multiplexer (DEMUX) for separating multi-wavelength light into a plurality of light beams of different wavelengths using filters, and a lens array for receiving the light beams and relaying them to respective optical detectors. The conventional ROSA, however, suffers from low alignment precision between the DEMUX and the lens array, and the yield of the conventional ROSA is thus poor.

This Background section is provided for background information only. The statements in this Background are not an admission that the subject matter disclosed in this section constitutes prior art to the present disclosure, and no part of this Background section may be used as an admission that any part of this application, including this Background section, constitutes prior art to the present disclosure.

SUMMARY

One aspect of the present disclosure provides an optical module including an aligning bridge configured to support and/or align an optical de-multiplexer and a lens array, and facilitate installation of the optical module in a package or box with limited space.

An optical module according to some embodiments of the present disclosure includes an aligning bridge, an optical de-multiplexer and a lens array. The aligning bridge has a first section and a second section opposite from (e.g., in a location on the aligning bridge opposed from) the first section. The optical de-multiplexer is on the first section of the aligning bridge. The optical de-multiplexer comprises a plurality of filters configured to transmit a plurality of light beams of different wavelengths. The lens array is on the second section of the aligning bridge. The lens array comprises a plurality of input ports and a plurality of output ports. The plurality of input ports are respectively aligned with the filters and are configured to receive the light beams from the filters.

In some embodiments, the first section of the aligning bridge comprises a first mesa. The first mesa may protrude from a surface of the aligning bridge.

In some embodiments, the second section of the aligning bridge comprises a second mesa. The second mesa may protrude from the surface of the aligning bridge.

In some embodiments, the second mesa has a first angled surface at a predetermined with respect to the surface of the aligning bridge, and the lens array has a second angled surface substantially parallel to the first angled surface of the second mesa.

In some embodiments, the optical module further comprises an adhesive layer between the first angled surface and the second angled surface configured to connect, bond or adhere the lens array and the second mesa.

In some embodiments, the adhesive layer is at a periphery of each of the first angled surface and the second angled surface, and a medium having a refractive index lower than that of the lens array is between the first angled surface and the second angled surface.

In some embodiments, the optical module further comprises a mirror (e.g., a total reflection mirror) on the second angled surface of the lens array. The mirror is configured to relay or reflect the light beams from the filters to the lens array.

In some embodiments, the aligning bridge includes one or more handling portions recessed or extending from one or more surfaces and/or the base of the aligning bridge.

In some embodiments, the optical module further comprises a package including a bottom, a plurality of walls connected to the bottom, and a cap connected to the walls, wherein the bottom and the walls cooperatively define an accommodation space, and the aligning bridge is in the accommodation space with the optical de-multiplexer and the lens array facing the bottom of the package or box. In further embodiments, the aligning bridge has a base (e.g., from which the first and second mesas and/or the handling portion[s] extend or protrude) facing the cap of the package or box.

In some embodiments, the optical de-multiplexer is (also) on the package or box.

In some embodiments, the optical module may further comprise a glue layer between the optical de-multiplexer and the bottom of the package or box, configured to secure or adhere the optical de-multiplexer to the bottom of the package or box.

In other embodiments, the glue layer is between the optical de-multiplexer and one or more of the walls of the package or box, and is configured to secure or adhere the optical de-multiplexer to the walls of the package or box.

In some embodiments, the lens array is on the package or box.

In some embodiments, the optical module may further comprise a glue layer between the lens array and the bottom of the package or box, configured to secure or adhere the lens array to the bottom of the package or box.

In other embodiments, the glue layer is between the lens array and the walls of the package or box, and is configured to secure or adhere the lens array to the walls of the package or box.

In some embodiments, the optical module further comprises a plurality of optical detectors on the bottom of the package or box. The optical detectors are aligned with the output ports of the lens array, and are configured to receive the light beams from the output ports. For example, each of the optical detectors is configured to receive a unique one of the light beams from the corresponding output port.

A method for assembling an optical module according to some embodiments of the present disclosure includes mounting, securing or adhering an optical de-multiplexer and a lens array at different locations of an aligning bridge, adjusting a location of the lens array with respect to a location of the optical de-multiplexer such that a plurality of input ports of the lens array are aligned with a plurality of filters of the optical de-multiplexer, inserting the aligning bridge into an accommodation space of a package or box with the optical de-multiplexer and the lens array facing a bottom of the package or box, and mounting, securing or adhering the optical de-multiplexer or the lens array on or in the package or box.

In some embodiments, the method further includes directing collimated light on an input terminal of the optical de-multiplexer through a transparent window of the package or box to calibrate a location of the aligning bridge prior to mounting, securing or adhering the optical de-multiplexer or the lens array on the package or box.

In some embodiments, the method further includes mounting, securing or adhering the optical de-multiplexer on the bottom or the walls of the package or box with a glue layer.

In some embodiments, the method further includes mounting, securing or adhering the lens array on the bottom or the walls of the package or box with a glue layer.

In some embodiments, the method further includes inserting the aligning bridge into the accommodation space of the package or box using a jig (e.g., to handle the aligning bridge) with the optical de-multiplexer and the lens array facing the bottom of the package or box. In some further embodiments, the jig comprises a clamp, and the method may further include clamping a handling portion of the aligning bridge using the clamp (e.g., while handling the aligning bridge and/or inserting the aligning bridge into the accommodation space of the package or box).

In some embodiments, the method further includes sealing the accommodation space with a cap after inserting the aligning bridge, the optical de-multiplexer and the lens array into the accommodation space.

The optical module includes an aligning bridge configured to preliminarily couple an optical de-multiplexer and a lens array together. The aligning bridge helps to ensure precise alignment between the filters of the optical de-multiplexer and the input ports of the lens array. The optical de-multiplexer and the lens array mounted on or adhered or secured to the aligning bridge can then be packaged in a package or box having optical detectors. The aligning bridge, by fixing the positions of the optical de-multiplexer and the lens array, facilitates alignment of the output ports of the lens array and the optical detectors. The handling portion of the aligning bridge further helps to facilitate installation of the optical de-multiplexer and lens array in the limited space of the package or box. Accordingly, the manufacturability and yield of the ROSA can be improved.

The foregoing has outlined rather broadly the features and technical advantages of the present disclosure in order that the detailed description of the disclosure that follows may be better understood. Additional features and advantages of the disclosure will be described hereinafter and may form the subject of the claims of the disclosure. It should be appreciated by those skilled in the art that the concepts and specific embodiments disclosed may be readily utilized as a basis for modifying or designing other structures or processes for carrying out the same or similar purposes as those of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, where:

DETAILED DESCRIPTION

The following description of the disclosure accompanies drawings, which are incorporated in and depict an optical module such as a receiver optical sub-assembly (ROSA) and a method of assembling such an optical module as described in this specification, and which illustrate embodiments of the disclosure, but the disclosure is not limited to the described embodiments. In addition, the described embodiments can be modified, combined and/or integrated to complete another embodiment.

References to "one embodiment," "an embodiment," "exemplary embodiment," "some embodiments," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, but rather, may be defined by the claims.

Figure 1:
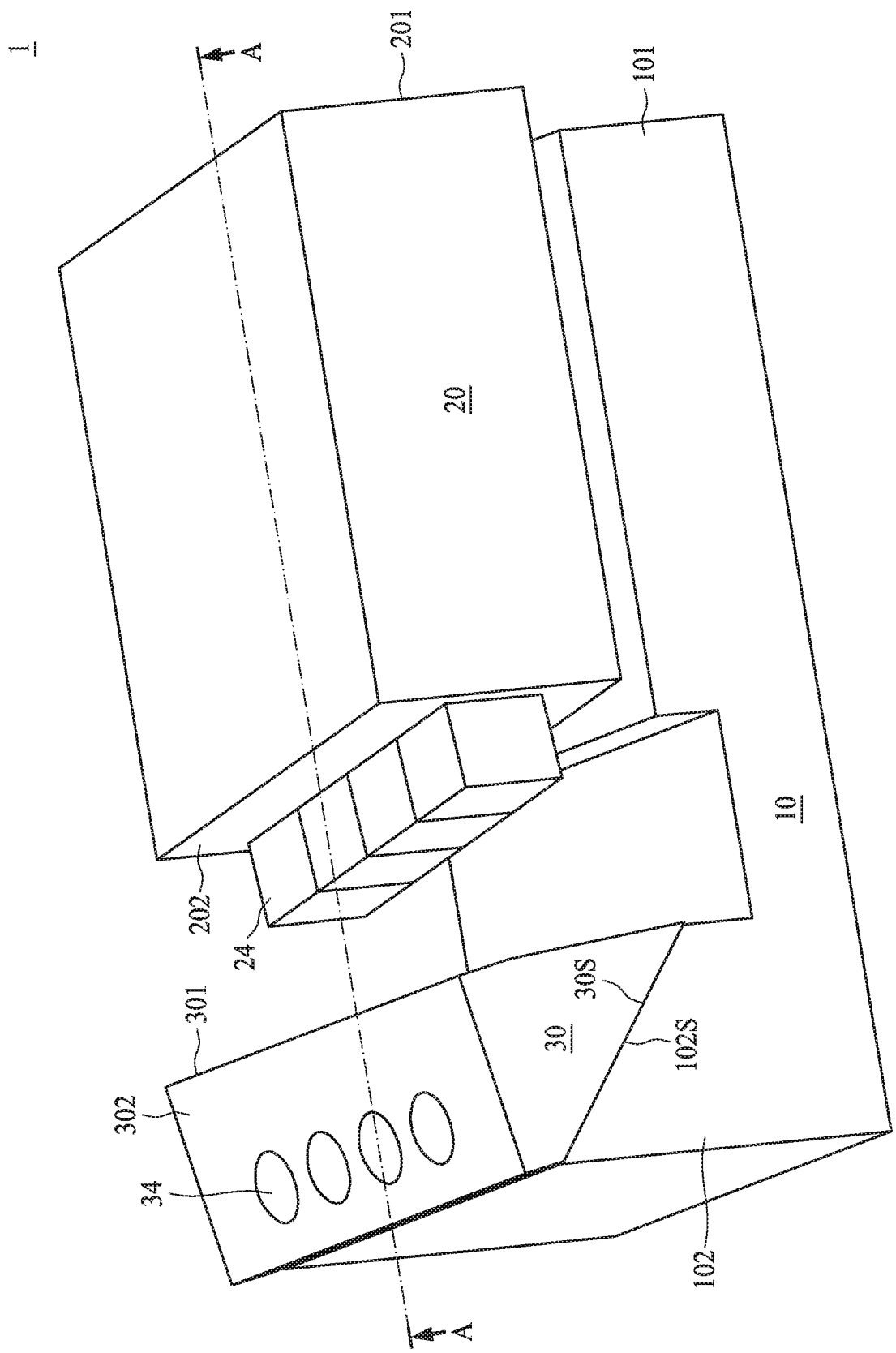
FIG. 1 is a schematic perspective view of an exemplary optical module in accordance with embodiments of the present disclosure.
Figure 2:
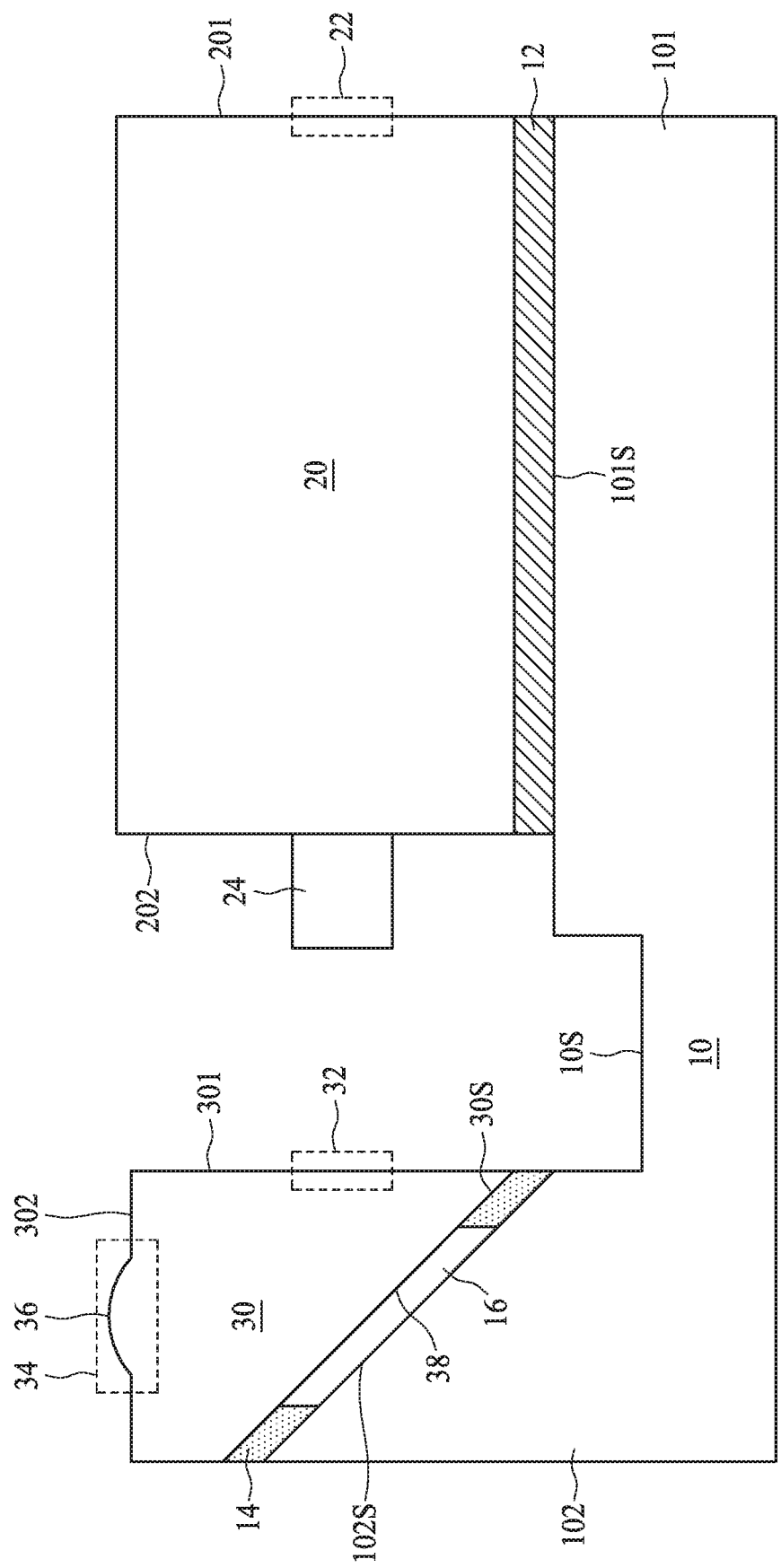
FIG. 2 is a schematic cross-sectional view of the exemplary optical module of FIG. 1 along the line A-A in accordance with embodiments of the present disclosure.

FIG. 1 is a perspective view of an optical module 1 in accordance with embodiments of the present disclosure, and FIG. 2 is a cross-sectional view of the optical module 1 of FIG. 1 along the line A-A in accordance with embodiments of the present disclosure. In the present disclosure, a receiver optical sub-assembly (ROSA) is used as an example, but the optical module of the present disclosure is not limited thereto.

As shown in FIG. 1 and FIG. 2, the optical module 1 includes an aligning bridge 10, an optical de-multiplexer (DEMUX) 20, and a lens array 30. The aligning bridge 10 has a first section 101 and a second section 102 opposite to the first section. The first section 101 is configured to support and/or align the optical DEMUX 20, and the second section 102 is configured to support and/or align the lens array 30. In some embodiments, the aligning bridge 10 comprises a metal or metal alloy, but is not limited thereto. By way of example, the material of the aligning bridge 10 may include a nickel-cobalt ferrous alloy such as Kovar® (a trademark of CRS Holdings, Inc., Wilmington, Del.), but is not limited thereto. Alternatively, the aligning bridge 10 may comprise another material having the same or substantially the same thermal expansion characteristics as a borosilicate glass or other material of the optical demultiplexer 20 and/or the lens array 30. In some embodiments, the first section 101 and the second section 102 of the aligning bridge 10 are formed monolithically with the aligning bridge 10, but the disclosure is not limited thereto.

The optical DEMUX 20 is mounted on the first section 101 of the aligning bridge 10. The optical DEMUX 20 can be mounted on the first section 101 in various manners. In some embodiments, the optical DEMUX 20 can be directly bonded to the first section 101 such as by van der Waals forces or the like. In some embodiments, the optical DEMUX 20 can be indirectly bonded to the first section 101, for example, using an adhesive layer 12 (shown in FIG. 2).

The optical DEMUX 20 is configured to separate multi-wavelength light into a plurality of light beams of different wavelengths. For example, the optical DEMUX 20 may include an input terminal 22 at a first side 201 configured to receive the multi-wavelength light, and a plurality of filters 24 at a second side 202 opposite to the first side 201, each filter being configured to transmit a unique one of the plurality of light beams, each having a different wavelength. In some embodiments, the optical DEMUX 20 may include, but is not limited to, four filters 24, for example, and each of the four filters 24 may pass a light beam having a unique one of four separate wavelengths, but reflect light having other ones of the four wavelengths. The number of filters 24 is based on the number of channels of the optical DEMUX 20. For example, a four-channel DEMUX 20 includes four filters 24.

The lens array 30 is mounted on the second section 102 of the aligning bridge 10. The lens array 30 may include a plurality of input ports 32 on a first surface 301, and a plurality of output ports 34 on a second surface 302. The input ports 32 are aligned with the filters 24 and are configured to receive the light beams from the filters 24. The output ports 34 are configured to output the light beams to respective optical detectors (not shown in FIG. 1 or FIG. 2). The number of the input ports 32 and the number of the output ports 34 of the lens array 30 are the same as the number of the filters 24 of the optical DEMUX 20.

In some embodiments, the first section 101 of the aligning bridge 10 includes a first mesa protruding from a surface 10S of the aligning bridge 10. The first mesa may have a surface 101S substantially parallel to the surface 10S. The optical DEMUX 20 may be on the first mesa. In some embodiments, the second section 102 of the aligning bridge 10 includes a second mesa protruding from the surface 10S of the aligning bridge 10. The second mesa may have a first angled surface 102S with respect to the surface 10S of the aligning bridge 10, and the lens array 30 has a second angled surface 30S substantially parallel to the first angled surface 102S of the second mesa. The optical module 1 may further include another adhesive layer 14 between the first angled surface 102S and the second angled surface 30S configured to connect the lens array 30 and the second mesa. In some embodiments, the adhesive layer 14 is disposed at a periphery of the first angled surface 102S and the second angled surface 30S. The frame-shaped adhesive layer 14 defines a space, and a medium 16 is confined between the first angled surface 102S and the second angled surface 30S. The medium 16 has a refractive index lower than that of the material of the lens array 30. For example, the medium 16 may be or comprise air (which has a refractive index of 1), and the material of the lens array 30 may be or comprise, but is not limited to, a glass (which may have a refractive index of about 1.5 to about 1.9). Accordingly, the interface between the medium 16 and the lens array 30 can serve as a reflection mirror 38, directing the light from the input ports 32 to the output ports 34. In some embodiments, the lens array 30 may further include one or more optical lenses 36. In some embodiments, the optical lens(es) 36 may be disposed at the output ports 34 as shown in FIG. 2, but are not limited thereto. In some other embodiments, the optical lens(es) 36 may be disposed at the input ports 32, or at both the input ports 32 and the output ports 34.

The aligning bridge 10 is configured to arrange or align the lens array 30 with the optical DEMUX 20 such that the input ports 32 of the lens array 30 and the filters 24 of the optical DEMUX 20 can be precisely aligned. Before the lens array 30 and the optical DEMUX 20 are permanently mounted on the aligning bridge 10, locations and orientations of the lens array 30 and the optical DEMUX 20 can be fine-tuned to ensure that the input ports 32 and the filters 24 are precisely aligned.

Figure 3:
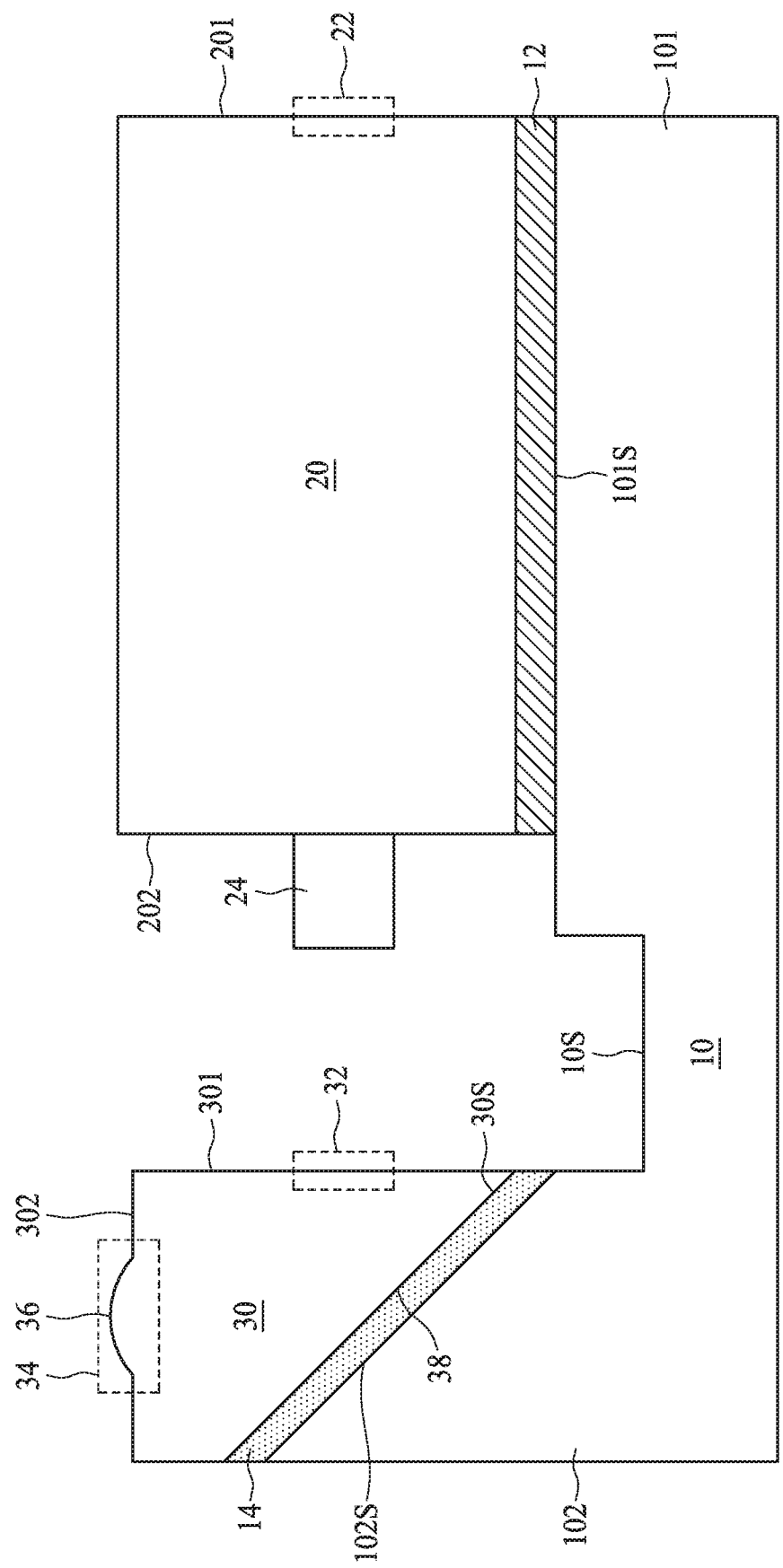
FIG. 3 is a schematic cross-sectional view of an exemplary optical module in accordance with embodiments of the present disclosure.

FIG. 3 is a schematic cross-sectional view of an optical module in accordance with some embodiments of the present disclosure. As shown in FIG. 3, in contrast to the optical module 1, the adhesive layer 14 of the optical module 2 may be between the first angled surface 102S of the second section 102 and the second angled surface 30S of the lens array 30. The optical module 20 may further include a reflection mirror 38 between the first angled surface 102S of the second section 102 and the second angled surface 30S of the lens array 30 configured to direct the light beams from the input ports 32 to the output ports 34. By way of example, the reflection mirror 38 may include a reflective film such as a silver or aluminum film or coating on the second angled surface 30S of the lens array 30.

Figure 4:
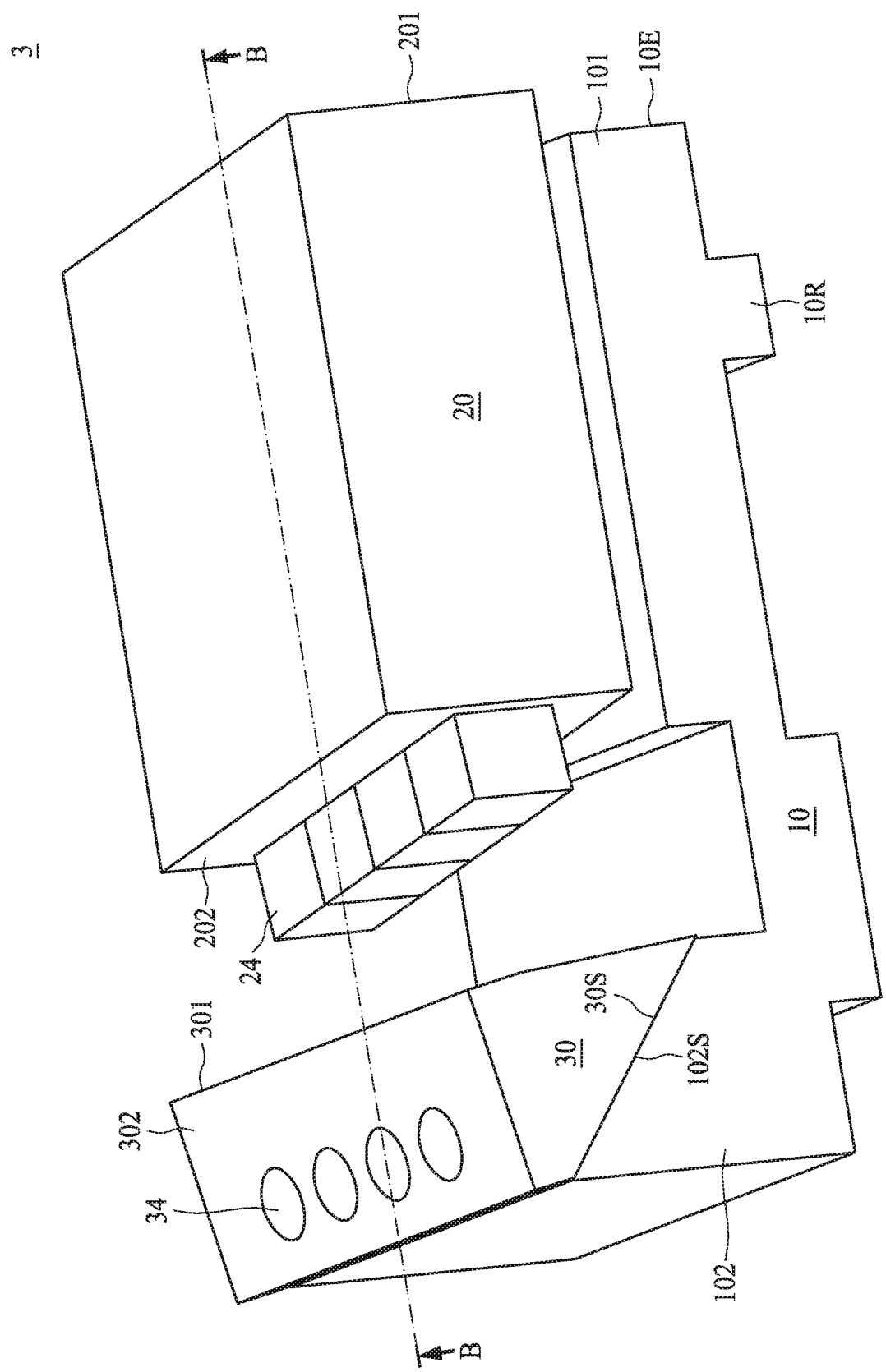
FIG. 4 is a schematic perspective view of an exemplary optical module in accordance with embodiments of the present disclosure.
Figure 5:
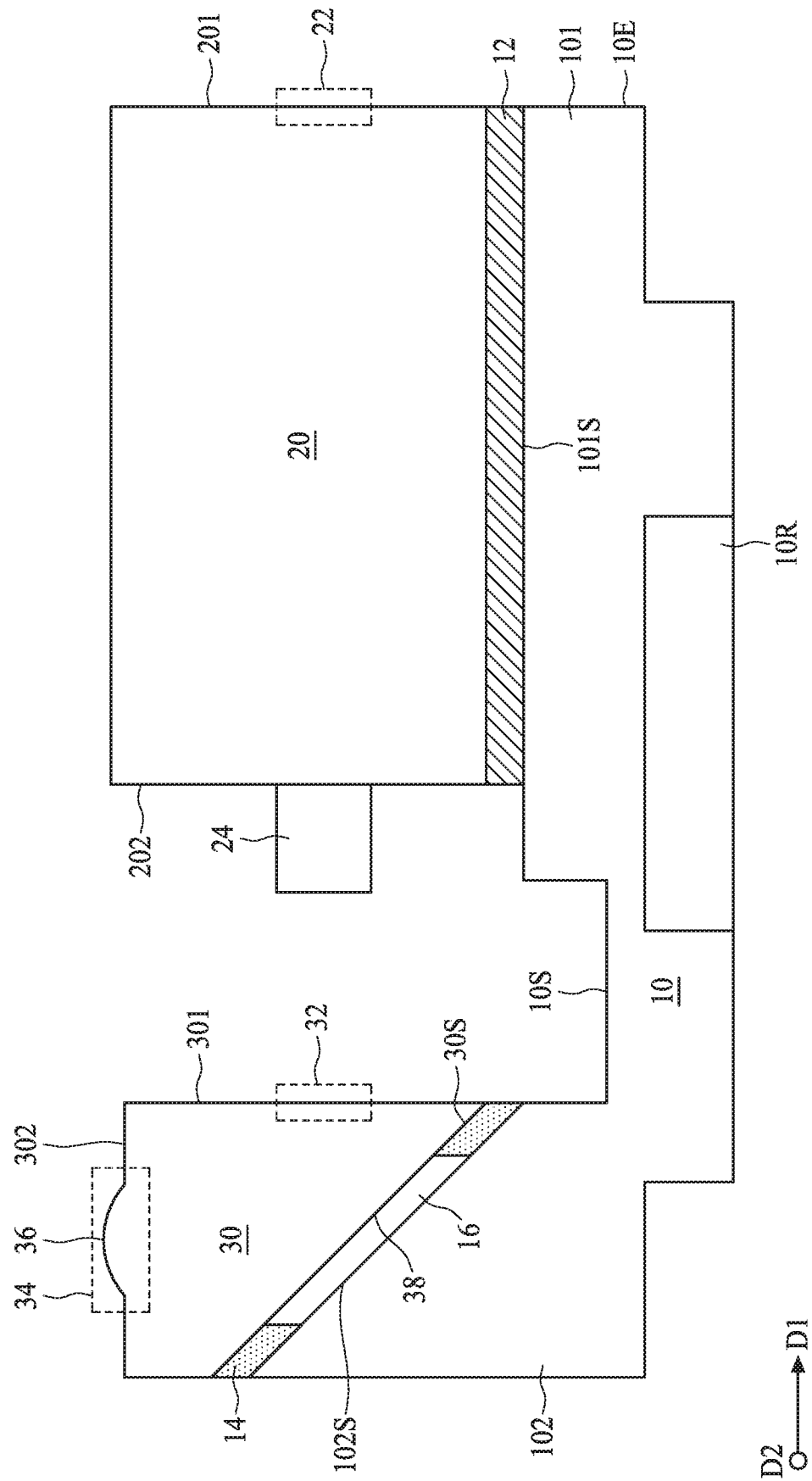
FIG. 5 is a schematic cross-sectional view of the exemplary optical module of FIG. 4 along the line B-B in accordance with embodiments of the present disclosure.

FIG. 4 is a schematic perspective view of an optical module in accordance with some embodiments of the present disclosure, and FIG. 5 is a schematic cross-sectional view of the optical module along the line B-B in FIG. 4 in accordance with some embodiments of the present disclosure. As shown in FIG. 4 and FIG. 5, in contrast to the optical module 1 or 2, the aligning bridge 10 of the optical module 3 may further include one or more handling portions 10R recessed from one or more edges 10E of the aligning bridge 10. Alternatively, the handling portion(s) 10R may extend from one or more sides or surfaces of the aligning bridge 10. The handling portion 10R has a narrower width than the non-handling portion of the aligning bridge 10, and is configured to allow a jig, such as a clamp, to handle the aligning bridge 10 while packaging the optical module 3. In some embodiments, the handling portions 10R are recessed from two opposing edges 10E of the aligning bridge 10 in a first direction D1 along which the optical DEMUX 20 and the lens array 30 are mounted or arranged. In some other embodiments, the handling portions 10R are recessed from two opposing edges 10E of the aligning bridge 10 in a second direction D2 substantially perpendicular to the first direction D1. In still some other embodiments, the handling portions 10R are recessed from four edges 10E of the aligning bridge 10. The four edges 10E may form a square or rectangle.

Figure 6:
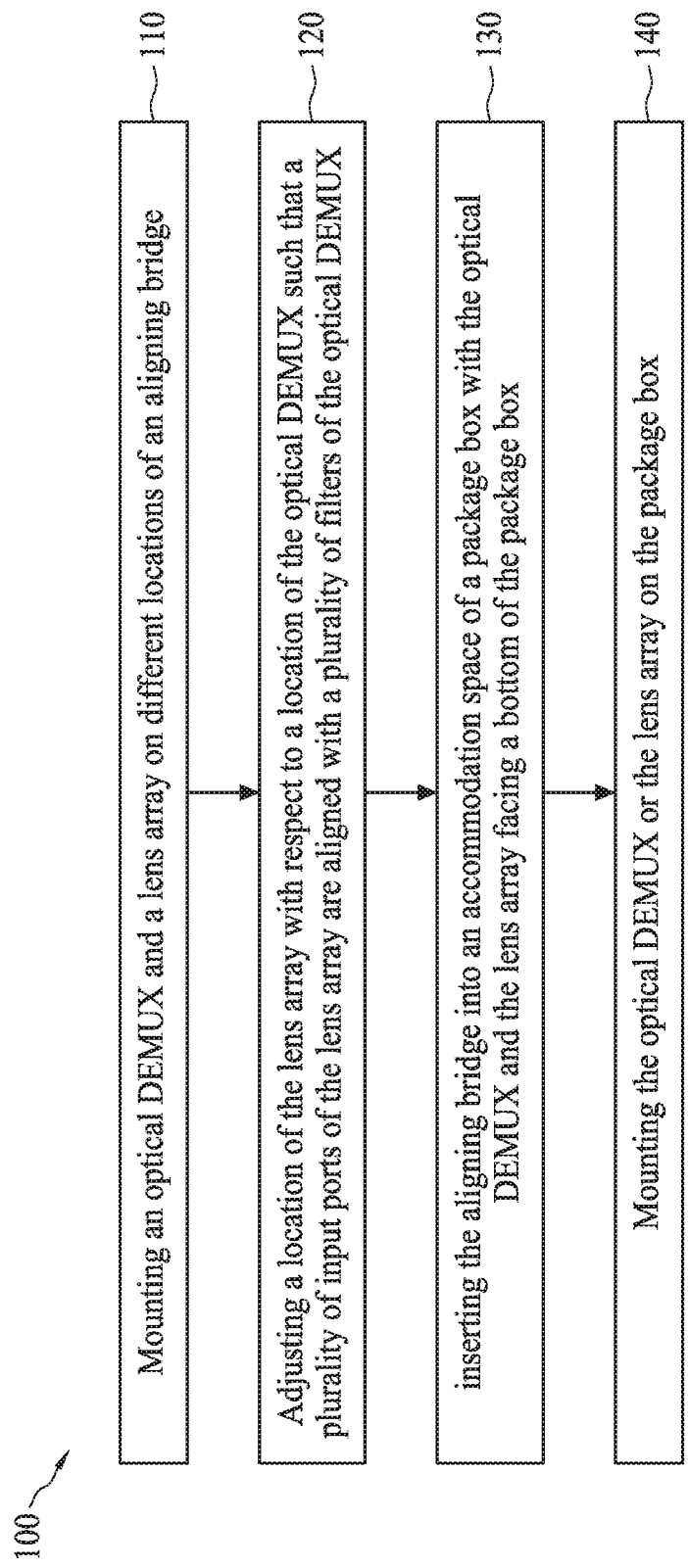
FIG. 6 is a flow chart illustrating an exemplary method for assembling an optical module according to various aspects of one or more embodiments of the present disclosure.

FIG. 6 is a flow chart illustrating a method for assembling an optical module according to various aspects of one or more embodiments of the present disclosure. The method 100 begins with step 110, in which an optical DEMUX and a lens array are mounted at different locations of an aligning bridge. The method proceeds with step 120, in which a location of the lens array with respect to a location of the optical de-multiplexer is adjusted such that a plurality of input ports of the lens array are aligned with a plurality of filters of the optical de-multiplexer (e.g., comprising aligning the lens array with the filters of the optical de-multiplexer). The method continues with step 130, in which the aligning bridge is inserted into an accommodation space of a package or box with the optical de-multiplexer and the lens array facing a bottom of the package or box. The method proceeds with step 140, in which the optical de-multiplexer and/or the lens array is mounted on the package or box.

The method 100 is merely an example, and is not intended to limit the present disclosure beyond what is explicitly recited in the claims. Additional steps can be provided before, during, and after the method 100, and some steps described can be replaced, eliminated, or changed in sequence for additional embodiments of the method.

Figure 7:
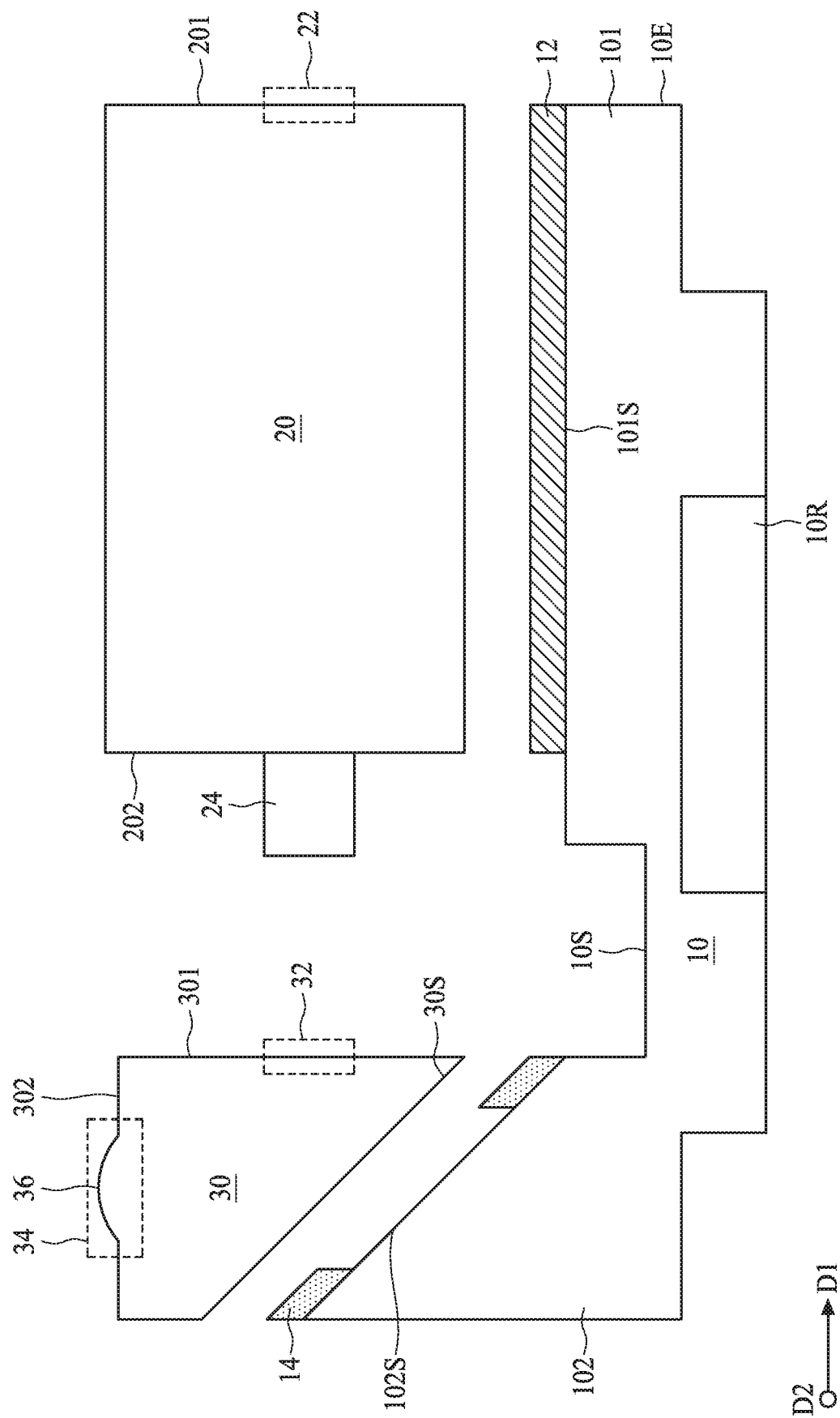
FIG. 7 to FIG. 11 are schematic views at various steps of an exemplary method of assembling an optical module according to embodiments of the present disclosure.

FIG. 7 to FIG. 11 are schematic views at various steps of assembling an optical module according to some embodiments of the present disclosure. As shown in FIG. 7, an optical DEMUX 20 and a lens array 30 are mounted at different locations of an aligning bridge 10. In some embodiments, the optical DEMUX 20 is mounted on a first section 101 of the aligning bridge 10 with an adhesive layer 12, and the lens array 30 is mounted on a second section 102 of the aligning bridge 10 with another adhesive layer 14. With the aligning bridge 10, the relative positions of the optical DEMUX 20 and the lens array 30 can be adjusted before the optical DEMUX 20 and the lens array 30 are coupled to other components such as optical detectors and a receptacle, such that the alignment of the optical module can be simplified.

Figure 8:
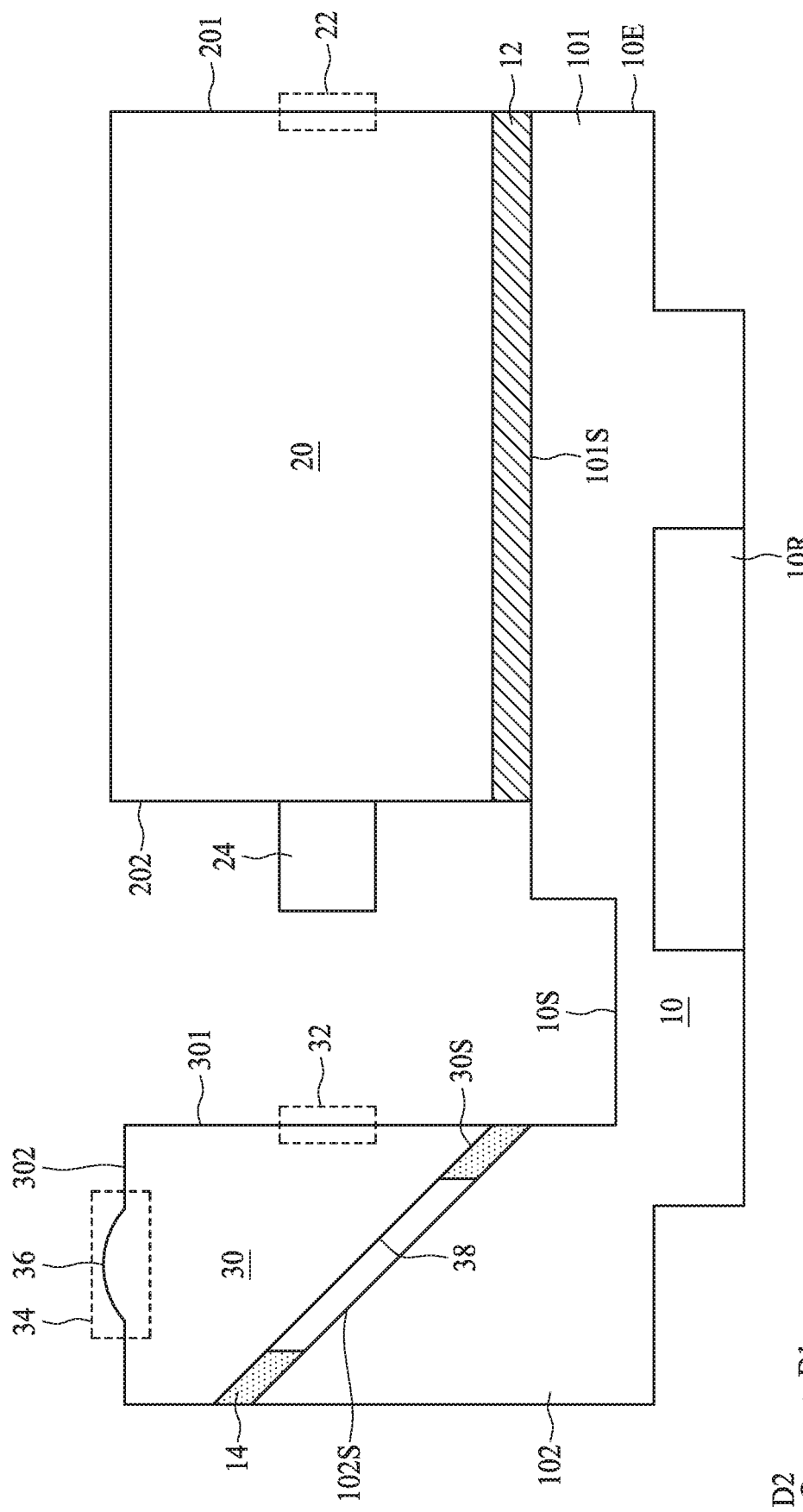

As shown in FIG. 8, the location of the lens array 30 with respect to the location of the optical DEMUX 20 can be adjusted such that the input ports 32 of the lens array 30 are aligned with the filters 24 of the optical DEMUX 20.

Figure 9:
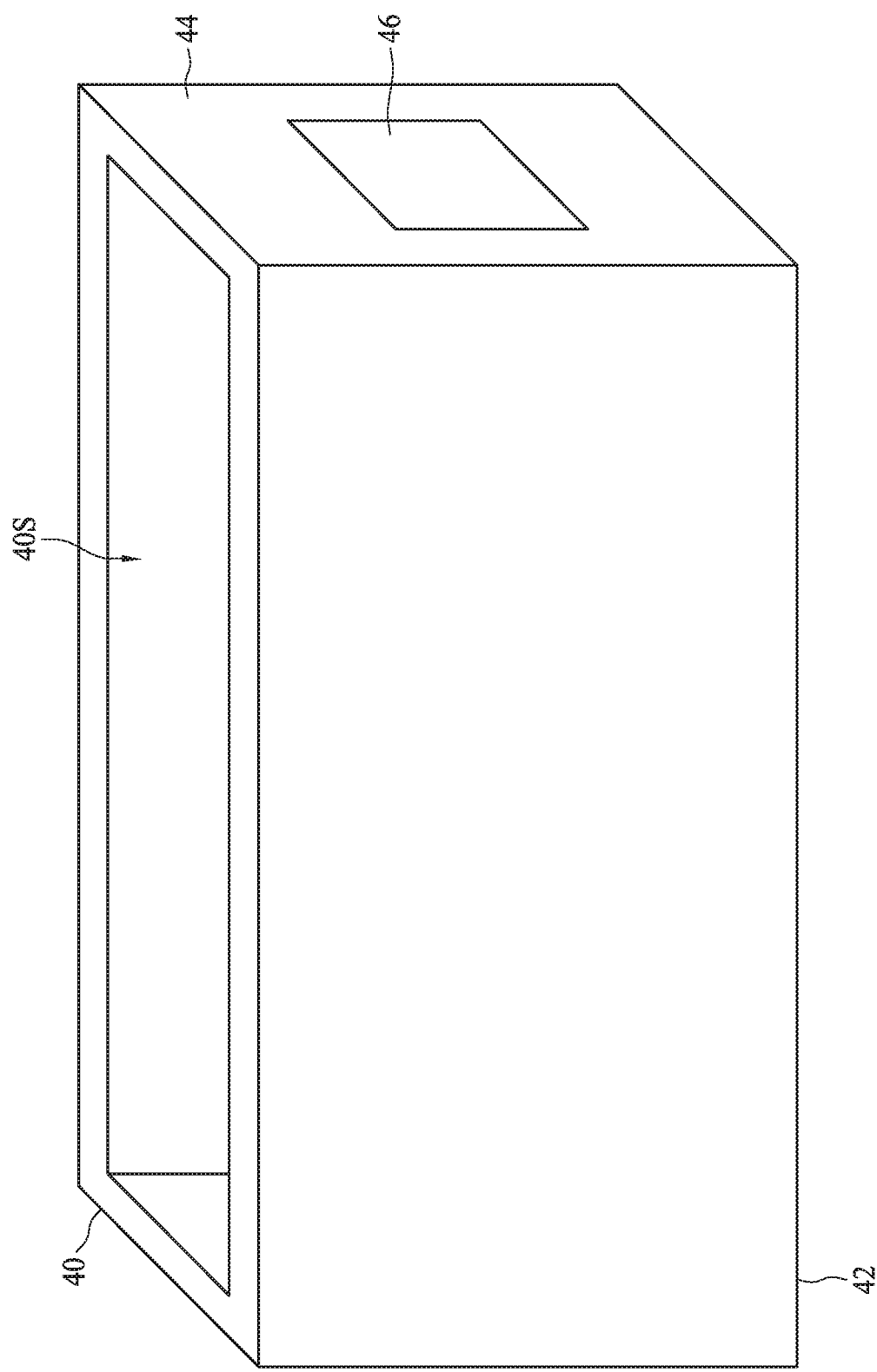

As shown in FIG. 9, a package or box 40 is received. The package or box 40 includes a bottom 42 and a plurality of walls 44 connected to the bottom 42. The bottom 42 and the walls 44 cooperatively define an accommodation space 40S with an opening. The package or box 40 is configured to package the optical module, protecting the optical module from being damaged by external forces, and isolating the optical module from excessive moisture, oxygen, dust and the like. In some embodiments, the package or box 40 may include a transparent window 46 in one of the walls 44. The transparent window 46 is configured to allow light to pass through. In some embodiments, the package or box 40 comprises or is made of a rigid and stable material such as a ceramic or the like. The transparent window 46 may comprise or be made of glass, quartz or other suitable materials transparent or substantially transparent to the light being received and/or processed by the optical DEMUX 20 and the lens array 30. In some other embodiments, a package substrate without walls may replace the package or box 40.

Figure 10:
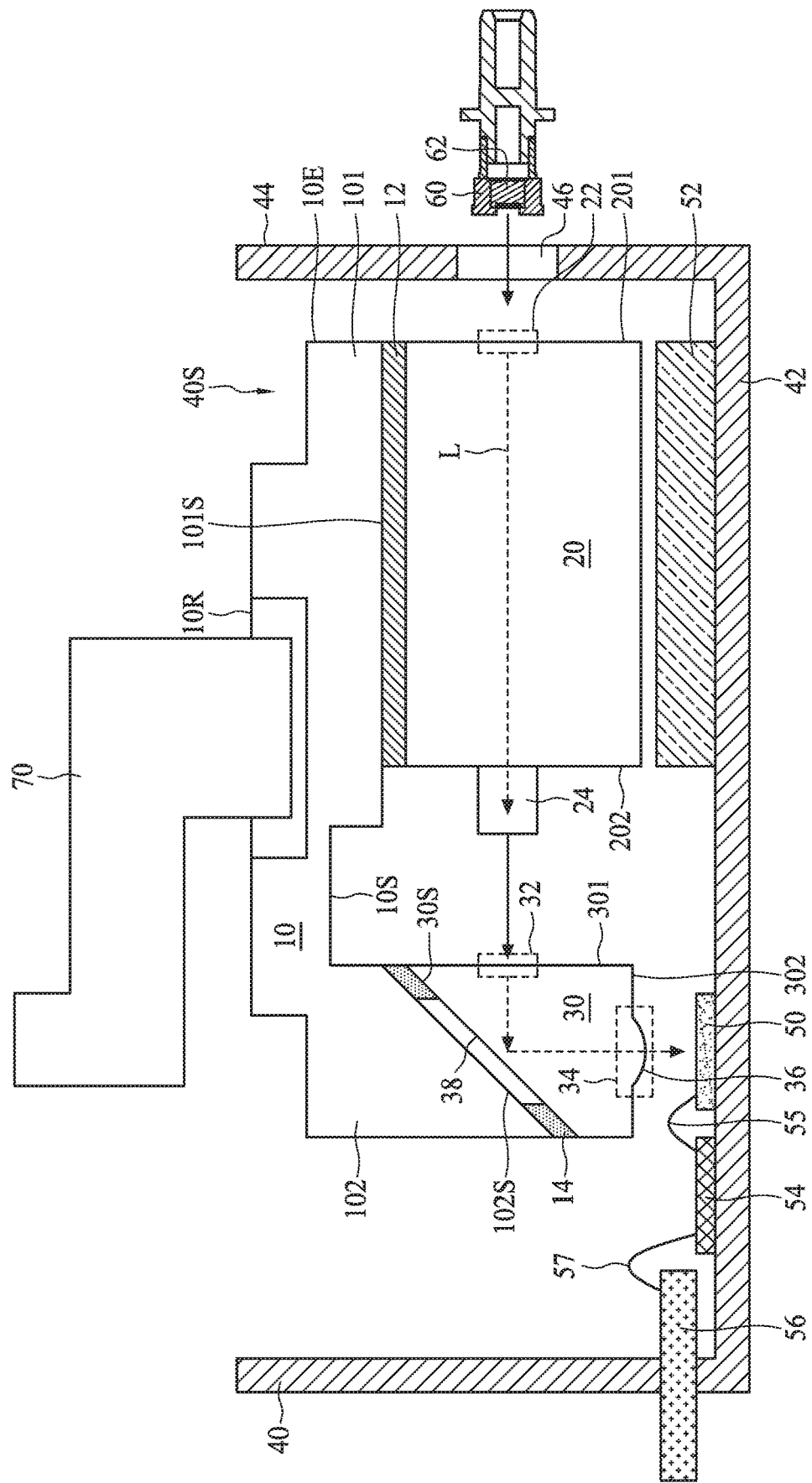

As shown in FIG. 10, a plurality of optical detectors 50 such as photo diode devices may be mounted and/or disposed on the bottom 42 of the package or box 40. The number of the optical detectors 50 is the same as the number of the output ports 34 of the lens array 30. In some embodiments, a processor or amplifier 54 may be mounted on the bottom 42 of the package or box 40 adjacent to the optical detectors 50. The processor or amplifier 54 may include a processing IC electrically connected to the optical detectors 50 by conductive wires 55 for example, and configured to process or amplify the signals detected by the optical detectors 50. Some embodiments may include a circuit board 56. In some embodiments, one end of the circuit board 56 may be inside the package or box 40 and electrically connected to the processor 54 by conductive wires 57, while the other end of the circuit board 56 may be outside the package or box 40 for external electrical connection.

The aligning bridge 10 with the optical DEMUX 20 and the lens array 30 thereon is then inserted into the package or box 40. The aligning bridge 10 facilitates the formation of the optical module in the limited accommodation space 40S of the package or box 40. In some embodiments, a glue layer 52 may be placed or deposited on the bottom 42 of the package or box 40 or on the optical DEMUX 20 to bond the optical DEMUX 20 to the package or box 40.

In some embodiments, a jig 70 may be used to handle the aligning bridge 10 during insertion of the aligning bridge 10 into the accommodation space 40S of the package or box 40. For example, the jig 70 may include a clamp or the like. The clamp can clamp the edge 10E of the aligning bridge 10 and can adjust the location of the aligning bridge 10 as well as the locations of the optical DEMUX 20 and the lens array 30. In some embodiments, the clamp can clamp the handling portions 10R of the aligning bridge 10. The handling portions 10R are recessed from the edge(s) 10E of the aligning bridge 10, preventing the clamp from excessively protruding from the edge 10E and allowing reduction of the size of the package or box 40. Accordingly, the overall size of the optical module can be reduced.

In some embodiments, collimated light L may be directed on the input terminal 22 of the optical DEMUX 20 through the transparent window 46 of the package or box 40 to calibrate the location of the aligning bridge 10 with respect to the optical detectors 50 and/or the package or box 40. For example, the calibration can allow fine-tuning of the location of the output ports 34 of the lens array 30 with respect to the optical detectors 50, prior to mounting the optical DEMUX 20 on the bottom 42 of the package or box 40. In some embodiments, a receptacle 60 with a collimator 62 is temporarily placed in front of the transparent window 46 to provide the collimated light L. With the collimated light L, the location of the output ports 34 of the lens array 30 with respect to the optical detectors 50 can be precisely calibrated before the aligning bridge 10 is permanently mounted or adhered in the package or box 40.

Figure 11:
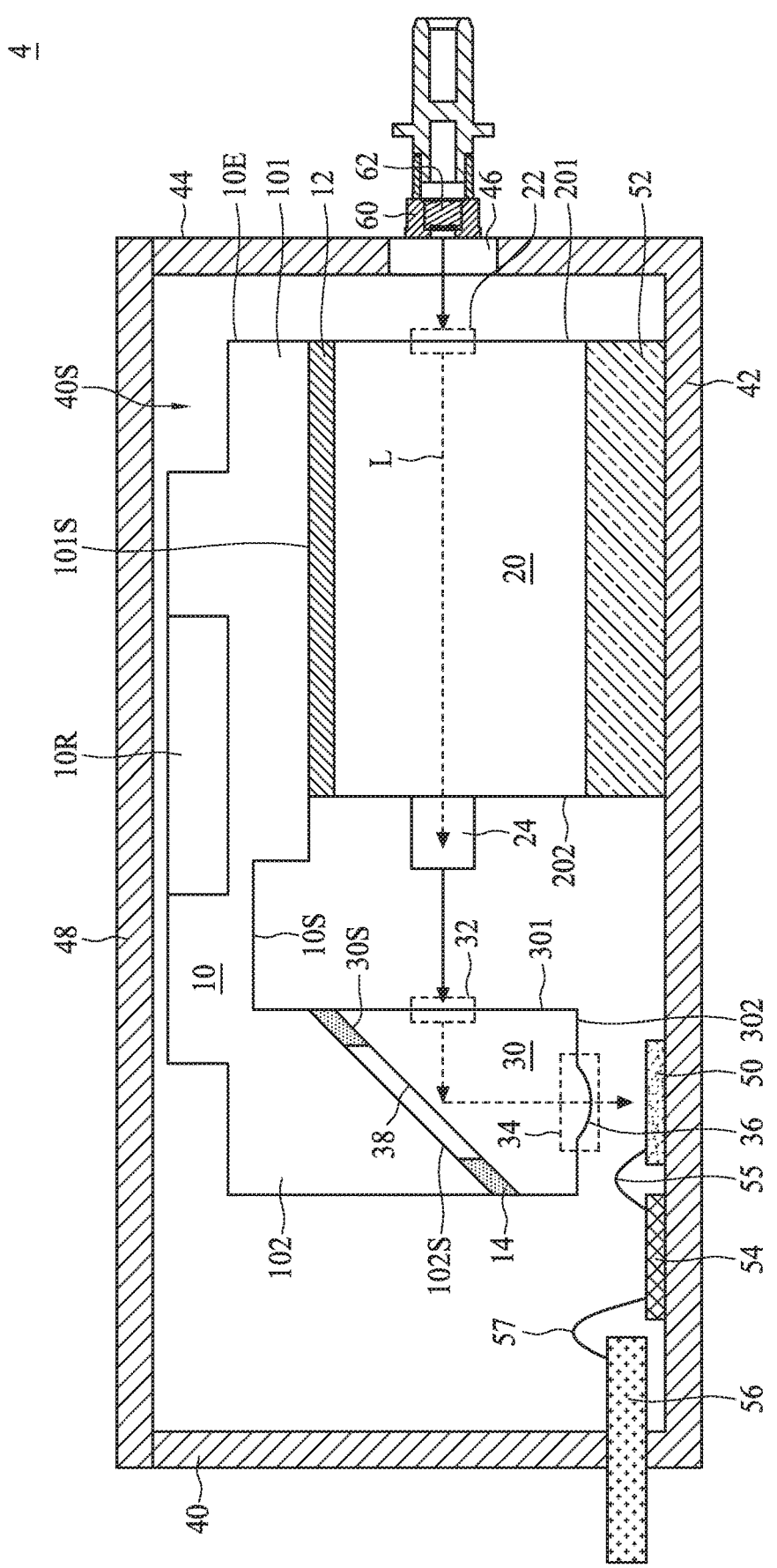

As shown in FIG. 11, the optical DEMUX 20 is permanently mounted on the bottom 42 of the package or box 40, e.g., by the glue layer 52, after the output ports 34 of the lens array 30 are precisely aligned with the optical detectors 50. In some embodiments, a cap 48 is disposed on or secured to the walls 44 to seal the accommodation space 40S of the package or box 40. In some embodiments, the accommodation space 40S may have a pressure of less than atmospheric pressure (e.g., a vacuum), or be filled with an inert gas such as nitrogen, to protect the components in the package or box 40 from exposure to an oxygen- and/or water-containing environment.

In some embodiments, the receptacle 60 and the collimator 62 can be mounted to the wall 44 of the package or box 40 to form the optical module 4. The receptacle 60 may be mounted on the wall 40 in a direct mounting manner such as by laser welding, or in an indirect manner such as by an adhesive layer.

Figure 12:
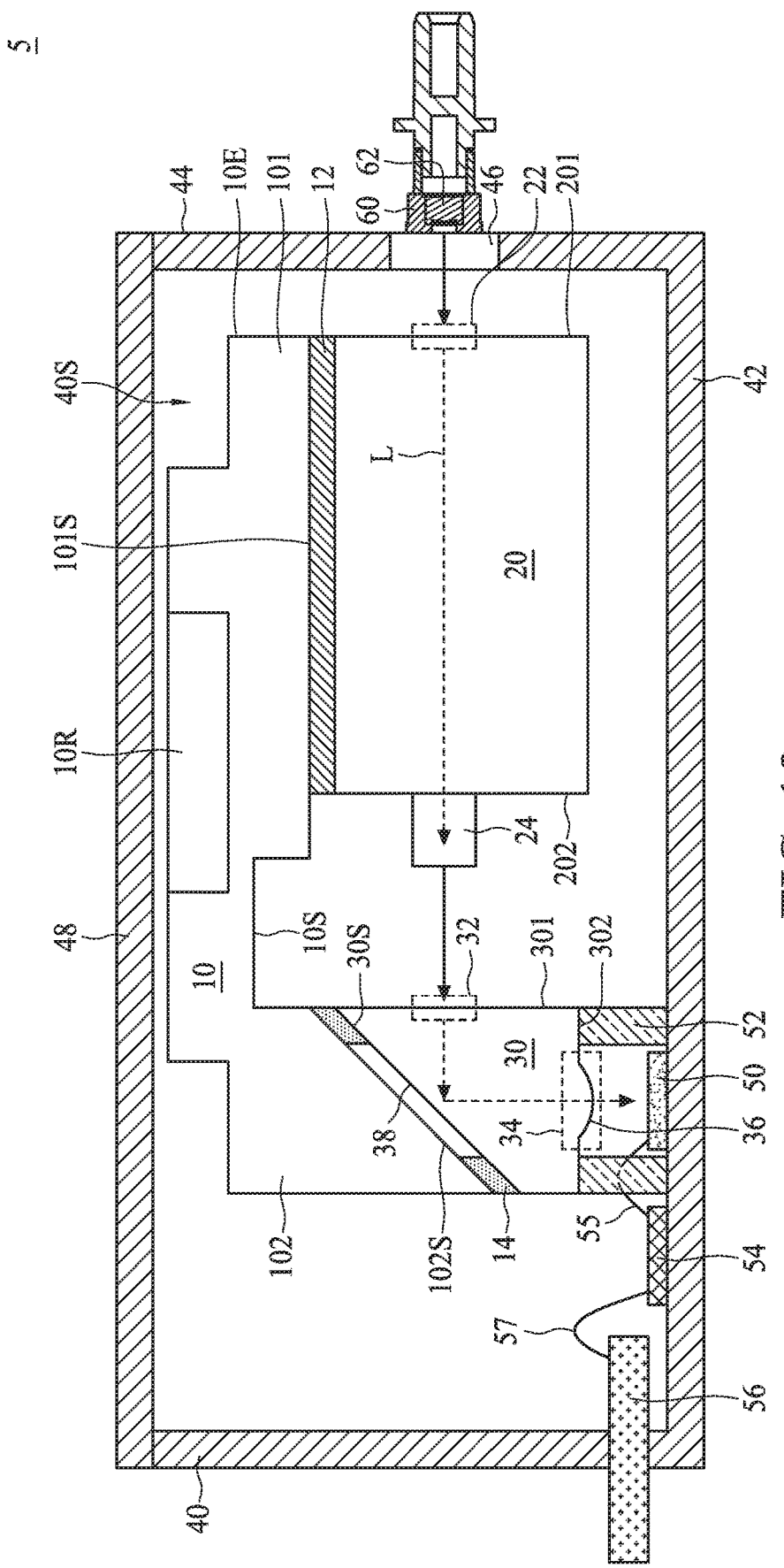
FIG. 12 is a schematic view of an exemplary optical module in accordance with embodiments of the present disclosure.

FIG. 12 is a cross-sectional schematic view of an optical module 5 in accordance with some embodiments of the present disclosure. As shown in FIG. 12, in contrast to the optical module 4 shown in FIG. 11, the glue layer 52 may be between the lens array 30 and the bottom 42 of the package or box 40. The glue layer 52 is configured without influencing the detection of the optical detectors 50. For example, the glue layer 52 may be formed in a peripheral region of the second surface 302 of the lens array 30.

Figure 13:
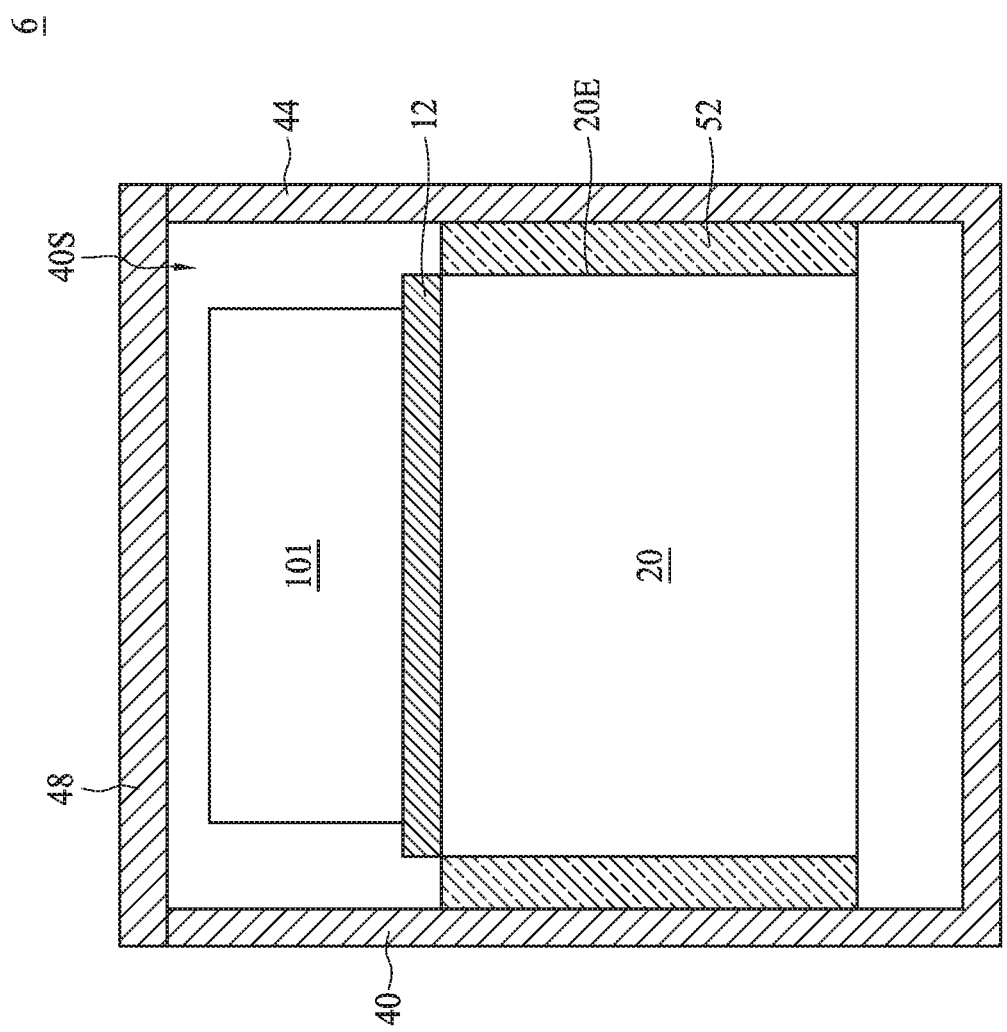
FIG. 13 is a schematic view of an exemplary optical module in accordance with embodiments of the present disclosure.

FIG. 13 is an end-on schematic view of an optical module 6 in accordance with some embodiments of the present disclosure. As shown in FIG. 13, in contrast to the optical module 4 shown in FIG. 11, the glue layer 52 may be between the walls 44 of the package or box 40 and the edges or sides 20E of the optical DEMUX 20.

Figure 14:
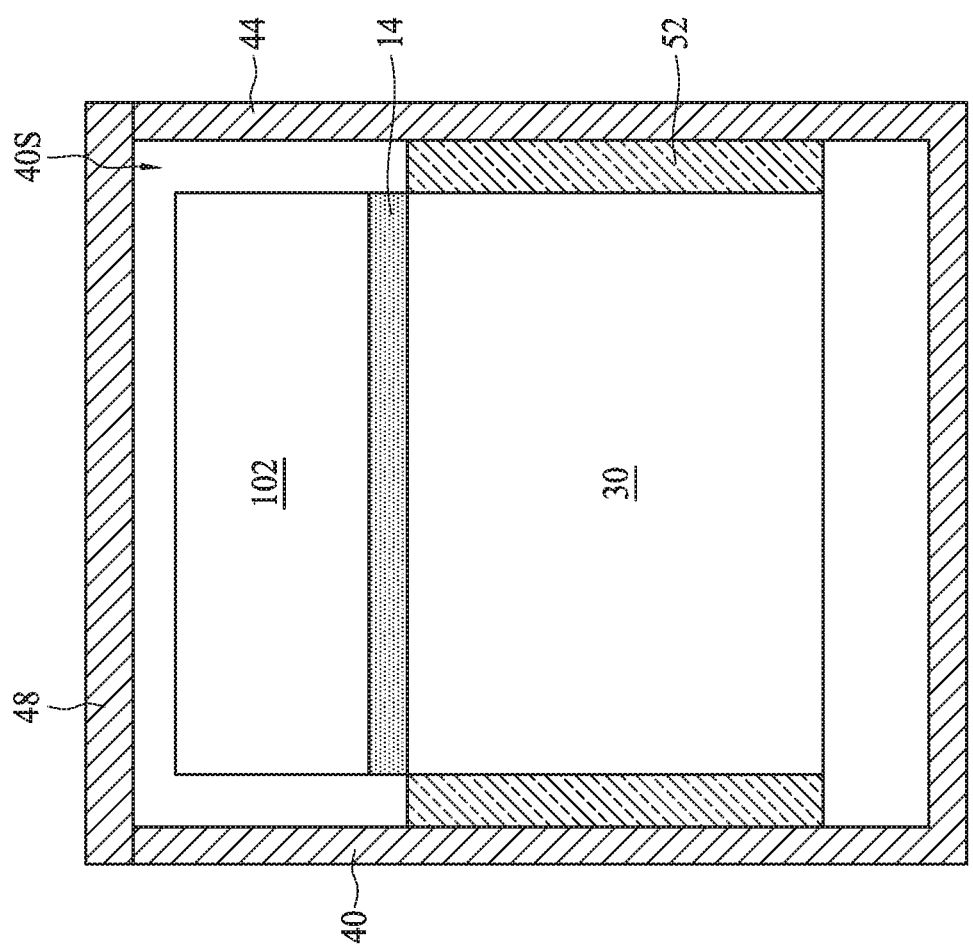
FIG. 14 is a schematic view of an exemplary optical module in accordance with embodiments of the present disclosure.

FIG. 14 is an end-on schematic view of an optical module 7 in accordance with some embodiments of the present disclosure. As shown in FIG. 14, in contrast to the optical module 4 shown in FIG. 11, the glue layer 52 may be between the walls 44 of the package or box 40 and the edges or sides 30E of the lens array 30. The lens array 30 may also have a width that is equal to a width of the aligning bridge 10 (depicted as the second section 102 in FIG. 14) so that the edges or sides of the lens array 30 align with the edges or sides of the aligning bridge 10.

In some embodiments of the present disclosure, the optical module includes an aligning bridge configured to preliminarily couple an optical DEMUX and a lens array together. The aligning bridge helps to ensure precise alignment between the filters of the optical DEMUX and the input ports of the lens array. The optical DEMUX and the lens array on the aligning bridge can then be packaged in a package or box having optical detectors. The aligning bridge fixes positions of the optical DEMUX and the lens array and facilitates alignment of the output ports of the lens array with the optical detectors. The handling portion of the aligning bridge further helps to facilitate installation of the optical DEMUX in a package or box having limited space. Accordingly, the manufacturability and yield of the ROSA can be improved.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An optical module, comprising:
    an aligning bridge having a first section and a second section opposite from the first section;
    an optical de-multiplexer (DEMUX) on the first section of the aligning bridge, wherein the optical de-multiplexer comprises a plurality of filters configured to transmit a plurality of light beams of different wavelengths; and
    a lens array on the second section of the aligning bridge, wherein:
        the second section of the aligning bridge comprises a mesa protruding from a surface of the aligning bridge, and the mesa has a first angled surface with respect to the surface of the aligning bridge, and
        the lens array comprises a plurality of input ports respectively aligned with the plurality of filters and configured to receive the light beams from the filters, a second angled surface substantially parallel to the first angled surface of the mesa, and a plurality of output ports.

2. The optical module of claim 1, wherein the first section of the aligning bridge comprises another mesa protruding from the surface of the aligning bridge.

3. The optical module of claim 1, further comprising an adhesive layer between the first angled surface and the second angled surface, configured to connect the lens array and the second mesa.

4. The optical module of claim 3, wherein the adhesive layer is at a periphery of the first angled surface and the second angled surface, and the optical module further comprises a medium having a refractive index lower than that of the lens array between the first angled surface and the second angled surface.

5. The optical module of claim 1, further comprising a reflection mirror on the second angled surface of the lens array, wherein the reflection mirror is configured to relay or reflect the light beams from the input ports to the respective output ports of the lens array.

6. The optical module of claim 1, wherein the aligning bridge includes a handling portion recessed or extending from one or more sides, surfaces or edges of the aligning bride.

7. The optical module of claim 1, further comprising a package or box including a bottom, a plurality of walls connected to the bottom, and a cap connected to the walls, wherein the bottom and the walls cooperatively define an accommodation space, and the aligning bridge is in the accommodation space with the optical de-multiplexer and the lens array facing the bottom of the package or box.

8. The optical module of claim 7, wherein the optical de-multiplexer and/or the lens array is on the package or box.

9. The optical module of claim 8, further comprising a glue layer between the optical de-multiplexer and either the bottom or one or more of the walls of the package or box, configured to secure or adhere the optical de-multiplexer to the package or box.

10. The optical module of claim 8, further comprising a glue layer between the lens array and either the bottom or one or more of the walls of the package or box, configured to secure or adhere the lens array to the package or box.

11. The optical module of claim 7, further comprising a plurality of optical detectors on the bottom of the package or box, wherein the optical detectors are aligned with the output ports of the lens array, and the optical detectors are configured to receive the light beams from the output ports.

12. An optical module, comprising:
an aligning bridge having a first section, a second section opposite from the first section, and a handling portion recessed or extending from one or more sides, surfaces or edges of the aligning bridge, wherein the second section of the aligning bridge comprises a mesa protruding from the surface of the aligning bridge and the mesa has a first angled surface with respect to the surface of the aligning bridge;
an optical de-multiplexer (DEMUX) on the first section of the aligning bridge, wherein the optical de-multiplexer comprises a plurality of filters configured to transmit a plurality of light beams of different wavelengths; and
a lens array on the second section of the aligning bridge, wherein the lens array comprises (i) a plurality of input ports respectively aligned with the plurality of filters and configured to receive the light beams from the filters, and (ii) a plurality of output ports, and the lens array has a second angled surface substantially parallel to the first angled surface of the mesa.

13. The optical module of claim 12, wherein the aligning bridge further comprises a base, the first section of the aligning bridge comprises a first mesa, the second section of the aligning bridge comprises a second mesa, and the handling portion comprises a protrusion from or a recess into one of the sides or surfaces of the base opposite from the first mesa and the second mesa.

14. An optical module, comprising:
a monolithic aligning bridge having a first section, a second section opposite from the first section, and a base integrated with the first section and the second section, wherein the second section comprises a mesa with a first angled surface with respect to a surface of the base;
an optical de-multiplexer (DEMUX) mounted, adhered or secured directly on the first section of the aligning bridge, wherein the optical de-multiplexer comprises a plurality of filters configured to transmit a plurality of light beams of different wavelengths; and
a lens array mounted, adhered or secured directly on the second section of the aligning bridge, wherein the lens array comprises (i) a plurality of input ports respectively aligned with the plurality of filters and configured to receive the light beams from the filters, and (ii) a plurality of output ports, and the lens array has a second angled surface substantially parallel to the first angled surface of the second mesa.

15. The optical module of claim 14, further comprising a first adhesive layer adhering the optical de-multiplexer to the first section of the aligning bridge.

16. The optical module of claim 15, further comprising a second adhesive layer adhering the lens array to the second section of the aligning bridge.

17. The optical module of claim 14, further comprising, between the first angled surface and the second angled surface, either (i) a reflection mirror or (ii) a medium having a refractive index lower than that of the lens array.

* * * * *